(12) United States Patent
Schel

(10) Patent No.: US 7,073,643 B2
(45) Date of Patent: Jul. 11, 2006

(54) COMPENSATED ROD FOR A FREQUENCY DEPENDENT DAMPER SHOCK ABSORBER

(75) Inventor: Sjaak Schel, Overasselt (NL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/694,255

(22) Filed: Oct. 27, 2003

(65) Prior Publication Data

US 2005/0087412 A1    Apr. 28, 2005

(51) Int. Cl.
*F16F 9/26* (2006.01)
(52) U.S. Cl. ............... 188/304; 188/282.8; 188/317; 188/322.15
(58) Field of Classification Search .......... 188/304, 188/322.15, 317, 316; 267/64.12, 64.15, 267/124
See application file for complete search history.

(56) References Cited

U.S. PATENT DOCUMENTS

| 3,273,876 | A | * | 9/1966 | Hannan ................. 267/186 |
| 3,734,483 | A | * | 5/1973 | Adams ................ 267/64.11 |
| 3,784,179 | A | * | 1/1974 | Sugiura ................ 267/35 |
| 4,328,960 | A | * | 5/1982 | Handke et al. .......... 267/226 |
| 4,441,593 | A | * | 4/1984 | Axthammer .......... 188/322.19 |
| 4,786,037 | A | * | 11/1988 | Mills ................. 267/226 |
| 4,887,515 | A | * | 12/1989 | Tabata ................. 92/80 |
| 4,907,495 | A | * | 3/1990 | Sugahara ................ 92/9 |
| 5,115,892 | A | * | 5/1992 | Yamaoka et al. ....... 188/282.5 |
| 5,513,108 | A | * | 4/1996 | Kishimoto et al. ......... 701/38 |
| 6,148,969 | A |   | 11/2000 | Lemmens |
| 6,511,085 | B1 | * | 1/2003 | Sawai .............. 280/124.157 |
| 6,648,310 | B1 | * | 11/2003 | Rottenberger et al. ... 267/64.26 |

\* cited by examiner

*Primary Examiner*—James McClellan
*Assistant Examiner*—Mariano Sy
(74) *Attorney, Agent, or Firm*—Harness, Dickey & Pierce, PLC

(57) ABSTRACT

A frequency-dependent damper incorporates a compensated piston assembly to reduce the amount of static push-out force. The piston rod is a hollow rod with a compensator being disposed within the hollow portion of the piston rod. The piston rod is a hollow rod with a compensator being disposed within the hollow portion of the piston rod. The compensator is attached to the pressure tube of the damper such that the compensator slides within the piston rod during stroking of the shock absorber. The compensated piston assembly reduces the difference in cross-sectional area between the upper and lower surfaces of the piston.

15 Claims, 4 Drawing Sheets

COMPENSATED ROD FOR A FREQUENCY DEPENDENT DAMPER SHOCK ABSORBER

FIELD OF THE INVENTION

The present invention relates generally to dampers or shock absorbers adapted for use in a suspension system such as the suspension system used for automotive vehicles. More particularly, the present invention relates to a shock absorber that utilizes a gas as the damping medium and that includes a compensated piston rod to reduce the static push-out force on the piston rod.

BACKGROUND OF THE INVENTION

Shock absorbers are used in conjunction with automotive suspension systems to absorb unwanted vibrations that occur during driving. To absorb these unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to the sprung portion of the vehicle through a piston rod that extends through the pressure tube. The piston divides the pressure tube into an upper working chamber and a lower working chamber, both of which are typically filled with a hydraulic liquid. Because the piston is able, through valving, to limit the flow of the hydraulic liquid between the upper and lower working chambers when the shock absorber is compressed or extended, the shock absorber is able to produce a damping force that counteracts the vibration that would otherwise be transmitted from the unsprung portion of the vehicle to the sprung portion of the vehicle. In a dual tube shock absorber, a fluid reservoir or reserve chamber is defined between the pressure tube and a reserve tube. A base valve assembly is disposed between the lower working chamber and the reserve chamber to also produce a damping force that counteracts the vibrations that would otherwise be transmitted from the unsprung portion of the vehicle to the sprung portion of the vehicle.

Shock absorbers filled with hydraulic liquid have met with continuous success throughout the automotive industry. While meeting with success in the automotive industry, hydraulic liquid filled shock absorbers are not without their problems. One problem with these prior art shock absorbers is that they are not sensitive to the frequency of the vibrations. Complex systems have been developed to modify these liquid filled shock absorbers to provide a shock absorber that is relatively soft for high frequency vibrations while being relatively stiff for low frequency vibrations. Other problems associated with the prior art hydraulic liquid filled shock absorbers include the variability in their damping forces due to temperature changes of the hydraulic liquid. As the temperature of the hydraulic liquid changes, the viscosity of the liquid also changes, which significantly affects the damping force characteristics of the liquid and, thus, the shock absorber. In addition, any aeration of the hydraulic liquid during operation of the shock absorber adversely affects the operation of the shock absorber due to the introduction of a compressible gas into a non-compressible liquid. Finally, the hydraulic liquid adds to the weight of the shock absorber, as well as presenting environmental concerns regarding the use and disposal of a hydraulic liquid.

In an effort to overcome the problems associated with shock absorbers that utilize hydraulic liquid as the damping medium, shock absorbers that utilize a gas as the damping medium having been developed. The use of a gas, preferably air, as the damping medium produces a frequency dependent damper or shock absorber that is significantly less sensitive to temperature when compared to hydraulic liquid dampers, is not adversely affected by aeration over time, is lower in weight and, especially when the gas is air, is environmentally friendly due to the elimination of the hydraulic oil.

While gas shock absorbers have resolved some of the issues that relate to hydraulic liquid shock absorbers, they are not without their own problems. One problem associated with gas shock absorber is a relatively high static push-out force that reacts against the piston, tending to extend the shock absorber. This static load is caused by the high pressure gas within the shock absorber in conjunction with the fact that the piston rod is located on only one side of the piston.

SUMMARY OF THE INVENTION

The present invention provides the art with a gas-filled shock absorber that incorporates a unique compensated piston rod assembly design that significantly reduces the static push-out force for the gas-filled shock absorber. The piston rod assembly incorporates a hollow piston rod that includes a compensator that reduces the difference between the cross-sectional area on the upper side of the piston and the cross-sectional area on the lower side of the piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
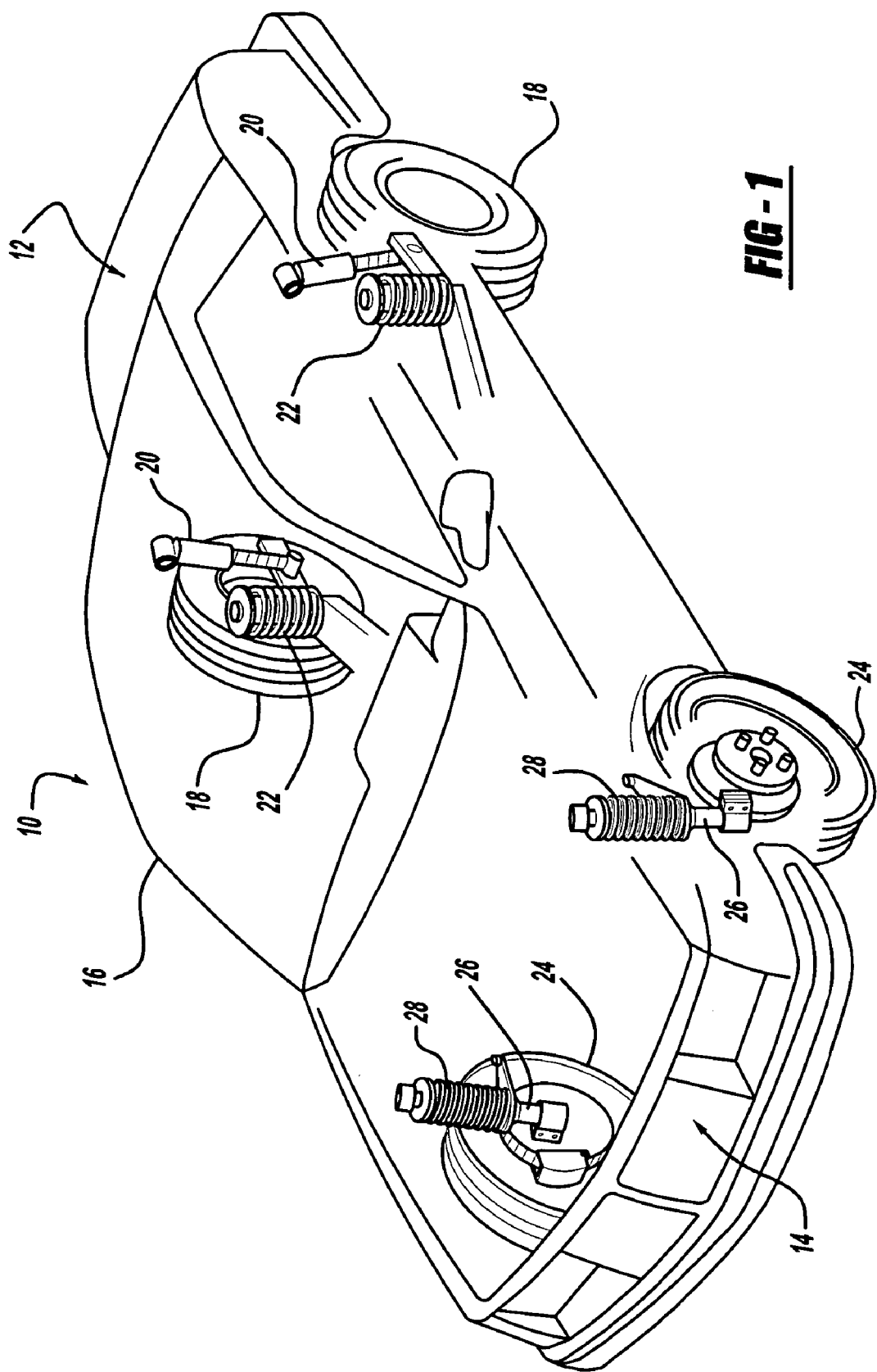
FIG. 1 is an illustration of an automobile incorporating the gas-filled shock absorber that incorporates the unique compensated piston assembly design in accordance with the present invention.

Referring now to the drawings in which like reference numerals designate like or corresponding parts throughout the several views, there is shown in FIG. 1 a vehicle incorporating a suspension system having the gas-filled shock absorbers, which incorporate the compensated piston assembly design in accordance with the present invention and which is designated generally by the reference numeral 10. Vehicle 10 includes a rear suspension system 12, a front suspension system 14 and a body 16. Rear suspension system 12 includes a pair of independent suspensions adapted to operatively support a pair of rear wheels 18. Each rear independent suspension is attached to body 16 by means of a shock absorber 20 and a helical coil spring 22. Similarly, front suspension system 14 includes a pair of independent suspensions adapted to operatively support a pair of front wheels 24. Each independent front suspension is attached to body 16 by means of a shock absorber 26 and a helical coil spring 28. Rear shock absorbers 20 and front shock absorbers 26 serve to dampen the relative movement of the unsprung portion (i.e., front and rear suspension systems 12 and 14, respectively) of vehicle 10 with respect to the sprung portion (i.e., body 16) of vehicle 10. While vehicle 10 has been depicted as a passenger vehicle having independent front and rear suspensions, shock absorbers 20 and 26 may be incorporated into other types of vehicles having other types of suspensions and springs or into other types of applications, including, but not limited to, vehicles incorporating air springs, leaf springs, non-independent front and/or non-independent rear suspension systems. One of the unique features of the present invention is that if it is combined with an air spring, the air spring and the shock absorber can communicate with each other or the air spring and the shock absorber can be separate units. Further, the term "shock absorber" as used herein is meant to refer to dampers in general and thus will include MacPherson struts, spring seat units, as well as other shock absorber designs known in the art.

Figure 2:
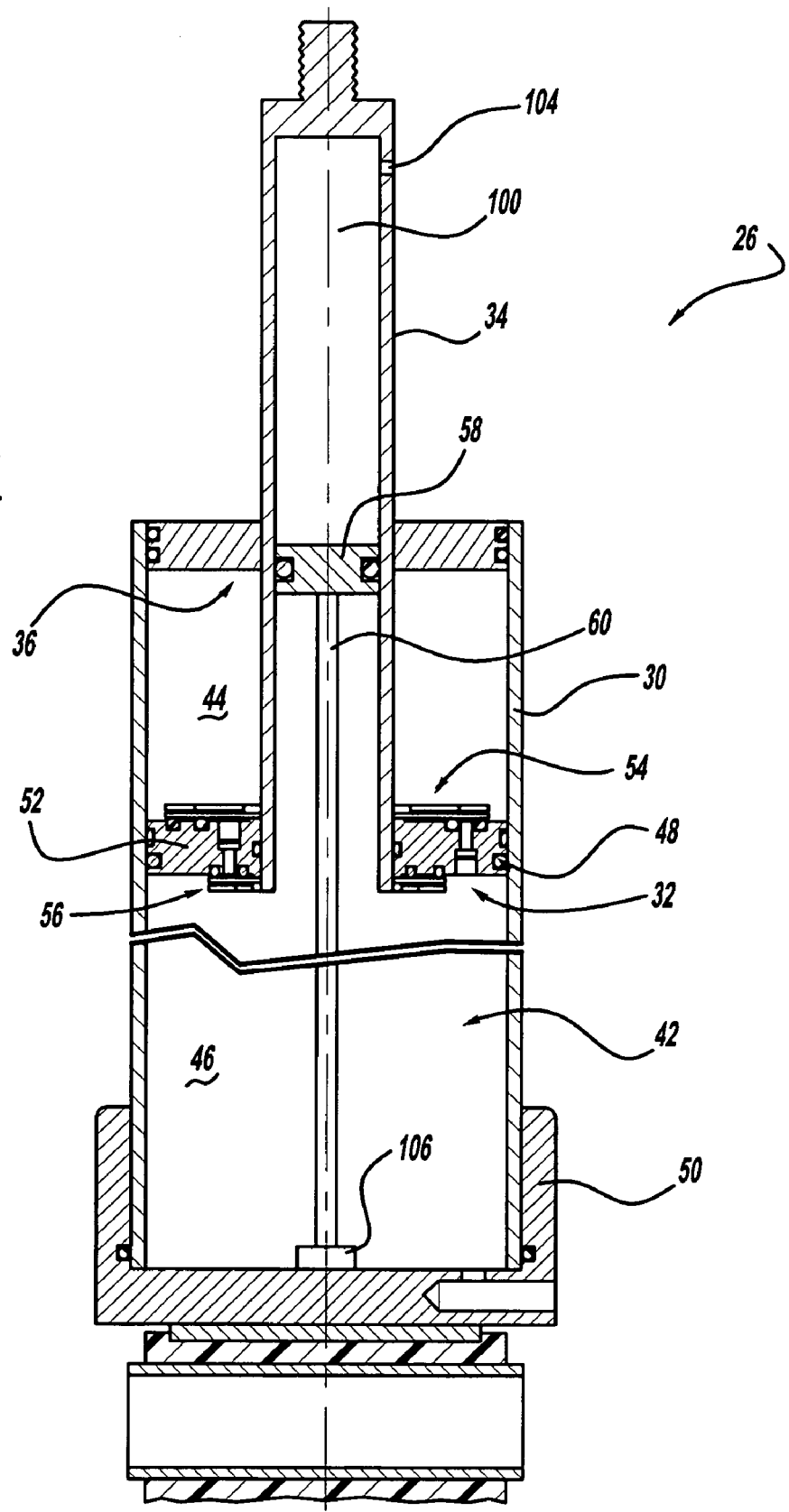
FIG. 2 is a side view, partially in cross-section, of the gas-filled shock absorber that incorporates the unique compensated piston assembly design in accordance with the present invention.

Referring now to FIG. 2, front shock absorber 26 is shown in greater detail. While FIG. 2 shows only front shock absorber 26, it is to be understood that rear shock absorber 20 is or can be designed to incorporate the compensated piston assembly design in accordance with the present invention. Rear shock absorber 20 would only differ from front shock absorber 26 in the way it is adapted to be connected to the sprung and unsprung portions of vehicle 10 and in the dimensions of the various components. Shock absorber 26 comprises a pressure tube 30, a compensated piston assembly 32, a piston rod 34 and a rod guide assembly 36.

Pressure tube 30 defines a working chamber 42. Working chamber 42 is filled with a gas, preferably air, at a specified pressure to act as the damping medium. Compensated piston assembly 32 is slidably disposed within working chamber 42 and divides working chamber 42 into an upper working chamber 44 and a lower working chamber 46. A seal assembly 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through rod guide assembly 36, which closes the upper end of pressure tube 30. The end of piston rod 34 opposite to piston assembly 32 is adapted to be secured to the sprung portion of vehicle 10. The end of pressure tube 30 opposite to rod guide assembly 36 is closed by an end cap 50 and end cap 50 is adapted to be connected to the unsprung portion of vehicle 10. While piston rod 34 is shown adapted for being connected to the sprung portion of vehicle 10 and end cap 50 is adapted for being connected to the sprung portion of vehicle 10, due to the use of a gas as the pressure medium, it is within the scope of the present invention to have piston rod 34 adapted to attach to the unsprung portion of vehicle 10 and end cap 50 adapted to attach to the sprung portion of vehicle 10 if desired.

Figure 3:
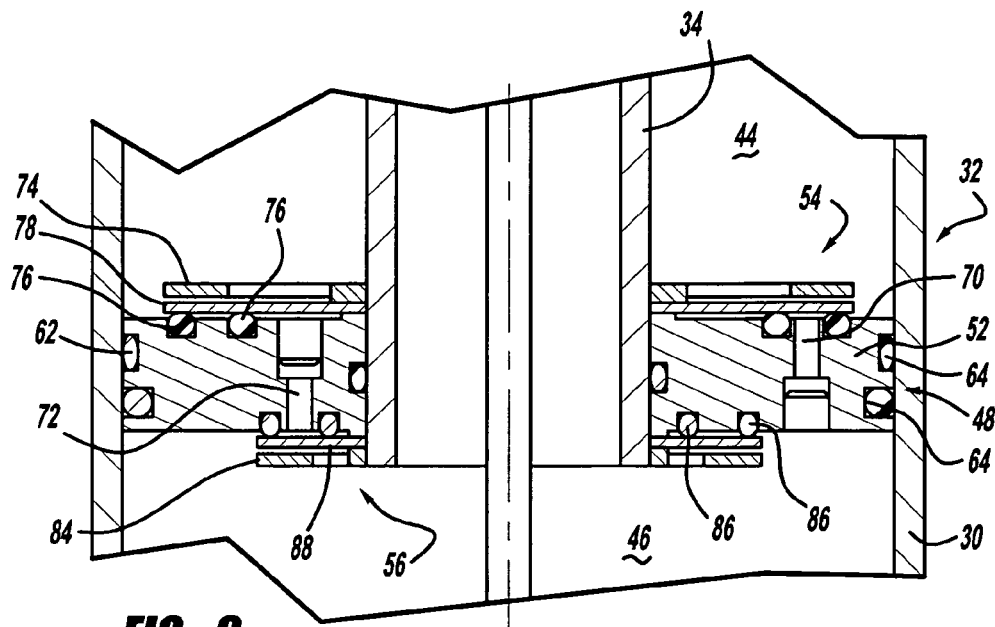
FIG. 3 is an enlarged cross-sectional view of the piston assembly illustrated in FIG. 2.
Figure 4:
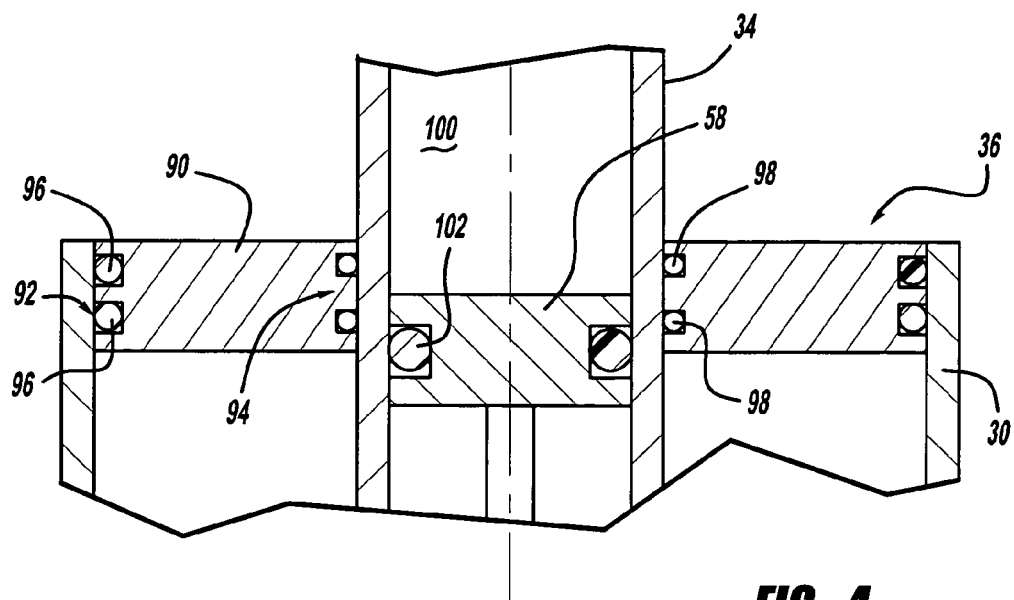
FIG. 4 is an enlarged cross-sectional view of the compensator illustrated in FIG. 2.

Referring now to FIGS. 2–4, compensated piston assembly 32 comprises a piston body 52, a compression valve assembly 54, a rebound or extension valve assembly 56, a compensator 58 and a connecting rod 60. Piston body 52 is attached to piston rod 34 by welding, by a threaded connection or by other means known in the art.

Seal assembly 48 comprises a pair of annular seals 62 located between piston body 52 and pressure tube 30. Seal assembly 48 is held in position by a plurality of grooves 64 formed in piston body 52. Seal assembly 48 permits sliding movement of piston body 52 with respect to pressure tube 30 without generating unique frictional forces as well as providing a seal between upper working chamber 44 and lower working chamber 46. This dual roll played by seal assembly 48 is extremely important for pneumatic shock absorber 26 due to the high pressures generated in working chambers 44 and 46 and the continued need for limiting the sliding forces generated between piston assembly 32 and pressure tube 30.

Piston body 52 defines one or more compression passages 70 and one or more extension passages 72. During a compression movement of shock absorber 26, gas flows between lower working chamber 46 and upper working chamber 44 through passages 70 as described below. During an extension movement of shock absorber 26, gas flows between upper working chamber 44 and lower working chamber 46 through passages 72 as described below.

Compression valve assembly 54 comprises a stop 74, a pair of annular seals 76 and a valve plate 78. Valve plate 78 is normally positioned against annular seals 76 to normally close the plurality of compression passages 70. During a compression stroke of shock absorber 26, the gas in lower working chamber 46 is compressed including the gas located within the plurality of compression passages 70. The compressed gas located within compression passages 70 exerts a force on valve plate 78, which will remain seated, closing passages 70 until the force created by the gas pressure exceeds the bending stiffness of valve plate 78. When the load produced by the gas pressure exceeds the bending stiffness of valve plate 78, valve plate 78 will deflect away from seals 76 to allow gas flow from lower working chamber 46 to upper working chamber 44 through passages 70.

Extension valve assembly 56 comprises a valve stop 84, a pair of annular seals 86 and a valve plate 88. Valve plate 88 is normally positioned against seals 86 to normally close the plurality of extension passages 72. During an extension stroke of shock absorber 26, the gas in upper working chamber 44 is compressed including the gas located within the plurality of extension passages 72. The compressed gas located within extension passages 72 exerts a force on valve plate 88, which will remain seated, closing passages 72 until the force created by the gas pressure exceeds the bending stiffness of valve plate 88. When the load produced by the gas pressure exceeds the bending stiffness of valve plate 88, valve plate 88 will deflect away from seals 86 to allow gas flow from upper working chamber 44 to lower working chamber 46 through passages 72.

Rod guide assembly 36 provides sealing for hollow piston rod 34 and pressure tube 30. Rod guide assembly 36 comprises a main housing 90, an outer seal assembly 92 and an inner seal assembly 94. Main housing 90 is pressfit or otherwise secured to pressure tube 30. Outer seal assembly 92 includes a pair of seals 96 disposed between pressure tube 30 and main housing 90. Hollow piston rod 34 is slidingly received within main housing 90; and inner seal assembly 94 includes a pair of seals 98 disposed between piston rod 34 and main housing 90. Inner seal assembly 94 permits sliding movement of piston rod 34 with respect to rod guide assembly 36 without generating undue frictional forces as well as sealing upper working chamber 44 from the environment surrounding shock absorber 26.

Compensator 58 is slidingly received within a cavity 100 defined by hollow piston rod 34. A seal 102 is disposed between piston rod 34 and compensator 58. Seal 102 permits sliding movement of piston rod 34 with respect to compensator 58 without generating undue frictional forces, as well as sealing lower working chamber 46 from the environment surrounding shock absorber 26. A vent hole 104 establishes communication between the portion of cavity 100 located above compensator 58 and the environment surrounding shock absorber 26. While the present invention is illustrated with vent hole 104, vent hole 104 is optional and can be deleted if desired.

Connecting rod 60 extends between end cap 50 and compensator 58 to maintain the position of compensator 58 with respect to pressure tube 30. Connecting rod 60 is attached to end cap 50 using an attachment 106. Attachment 106 is a flexible attachment that provides an improved alignment of piston rod 34 with compensator 58.

In a typical solid piston rod design for a gas shock absorber, the pressure of the gas within pressure tube reacts against the upper side of the piston and against the lower side of the piston. In a static condition, the gas pressure in the upper working chamber and the lower working chamber is generally equal. This creates a push-out force that attempts to extend the shock absorber. This creation of the push-out force is caused by the area of the piston open to the lower chamber being larger than the area of the piston open to the upper working chamber due to the piston rod being located in only the upper working chamber.

The present invention significantly reduces this difference in the area exposed to the lower and upper working chambers 44 and 46, respectively, by incorporating compensated piston assembly 32. In compensated piston assembly 32, the difference in area exposed to the gas pressure is reduced to the cross-sectional area of hollow piston rod 34, and not cavity 100, thus significantly reducing the static push-out force.

Figure 5:
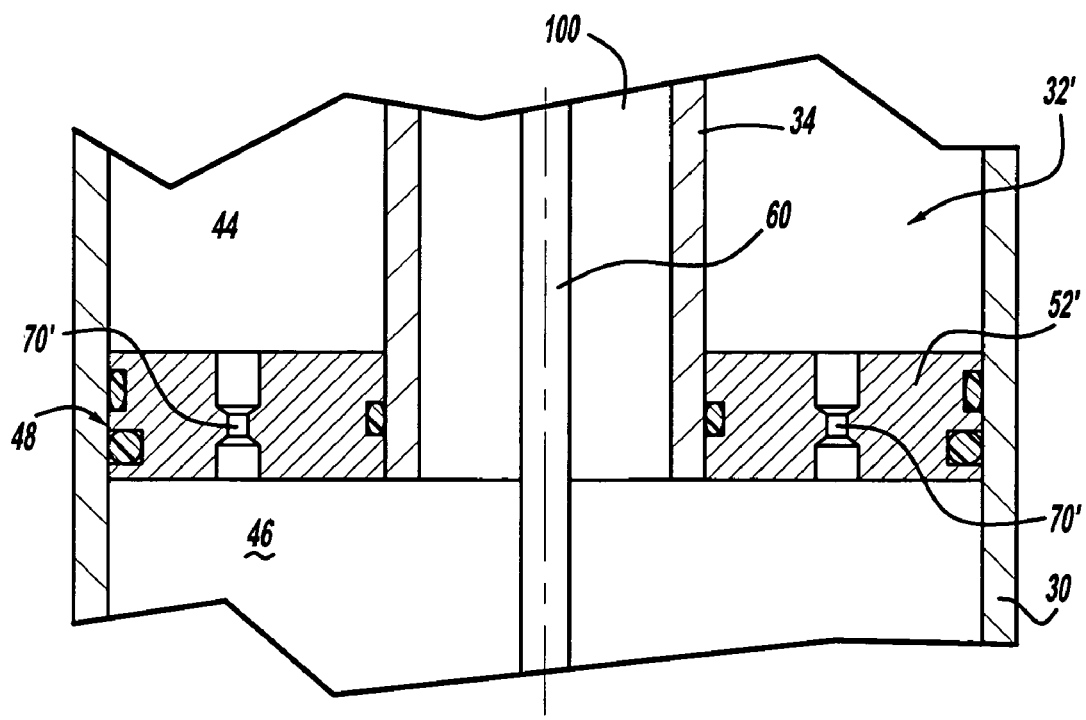
FIG. 5 is a view similar to FIG. 3, but illustrating a compensated piston assembly in accordance with another embodiment of the present invention.

Referring now to FIG. 5, a compensated piston assembly 32' is illustrated. Compensated piston assembly 32' is designed to be a direct replacement for compensated piston assembly 32. Compensated piston assembly 32' comprises a piston body 52' and at least one tunable restriction 70'. Tunable restriction 70' replaces passages 70 and 72 of piston assembly 32 and provides communication between upper working chamber 44 and lower working chamber 46. The damping characteristics for a shock absorber 26 that incorporates piston assembly 32' is controlled by the size of tunable restriction 70'. The function, operation and advantages listed above for shock absorber 26 utilizing piston assembly 32 are the same for shock absorber 26 when piston assembly 32' replaces piston assembly 32.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A damper comprising:
a pressure tube defining a working chamber;
a piston disposed within said working chamber, said piston dividing said working chamber into a lower working chamber and an upper working chamber, said upper working chamber being sealed to eliminate all direct communication between said upper working chamber and an environment outside said damper;
a piston rod attached to said piston, said piston rod extending through one of said upper and lower working chambers, said piston rod defining a cavity; and
a solid disc shaped compensator disposed within said cavity, said compensator dividing said cavity into a vented portion and a non-vented portion, said non-vented portion being in communication with said lower working chamber, said compensator being stationary with respect to said pressure tube; wherein
said piston rod defines a vent hole extending between said cavity and atmospheric pressure.

2. The damper according to claim 1, further comprising a connecting rod extending between said compensator and said pressure tube.

3. The damper according to claim 2, wherein said pressure tube includes an end cap, said connecting rod being attached to said end cap.

4. The damper according to claim 1, wherein said compensator sealingly engages said piston rod.

5. The damper according to claim 1, wherein said compensator is in communication with the other of said upper and lower working chambers.

6. The damper according to claim 1, further comprising a flow path extending through said piston to provide communication between said upper and lower working chambers.

7. The damper according to claim 6, further comprising a compression valve assembly attached to said piston, said compression valve assembly prohibiting fluid flow from said upper working chamber to said lower working chamber.

8. The damper according to claim 7, further comprising an extension valve assembly attached to said piston, said extension valve assembly prohibiting fluid flow from said lower working chamber to said upper working chamber.

9. The damper according to claim 6, wherein said flow path is an open flow path.

10. A damper comprising:
a pressure tube defining a working chamber;
a piston disposed within said working chamber, said piston dividing said working chamber into a lower working chamber and an upper working chamber, said upper working chamber being sealed to eliminate all direct communication between said upper working chamber and an environment outside said damper;
a piston rod attached to said piston, said piston rod defining a cavity;
a solid disc shaped compensator disposed within said cavity and sealingly engaging said piston rod said compensator dividing said cavity into a vented portion and a non-vented portion, said non-vented portion being in communication with said lower working chamber; and
a connecting rod extending between said compensator and said pressure tube; wherein
said piston rod defines a vent hole extending between said cavity and atmospheric pressure.

11. The damper according to claim 10, wherein said pressure tube includes an end cap, said connecting rod being attached to said end cap.

12. The damper according to claim 10, further comprising a flow path extending through said piston to provide communication between said upper and lower working chambers.

13. The damper according to claim 12, further comprising a compression valve assembly attached to said piston, said compression valve assembly prohibiting fluid flow from said upper working chamber to said lower working chamber.

14. The damper according to claim 13, further comprising an extension valve assembly attached to said piston, said extension valve assembly prohibiting fluid flow from said lower working chamber to said upper working chamber.

15. The damper according to claim 12, wherein said flow path is an open flow path.

* * * * *